United States Patent [19]

Laurie et al.

[11] 4,273,731
[45] Jun. 16, 1981

[54] GAS/LIQUID EXCHANGE APPARATUS

[76] Inventors: Alec H. Laurie, 21 Lyndewode Rd., Cambridge; John H. Kalicki, Old Farm Cottages, Stubbs Walden, Doncaster, both of England

[21] Appl. No.: 735,396

[22] Filed: Oct. 26, 1976

[30] Foreign Application Priority Data

Oct. 31, 1975 [GB] United Kingdom ............ 45397/75

[51] Int. Cl.³ .............................................. C02B 1/34
[52] U.S. Cl. .................................. 261/77; 261/124; 261/DIG. 75; 405/52
[58] Field of Search ............... 61/6, 1 R; 261/77, 124, 261/DIG. 75; 43/57

[56] References Cited

U.S. PATENT DOCUMENTS

| 1,867,143 | 7/1932 | Fohl | 261/124 |
|---|---|---|---|
| 2,708,571 | 5/1955 | Fischerstrom et al. | 261/DIG. 75 |
| 2,719,032 | 9/1955 | Schnur | 261/DIG. 75 |
| 3,097,072 | 7/1963 | Lippman, Jr. et al. | 261/77 |
| 3,169,921 | 2/1965 | Griffith | 261/124 |
| 3,330,119 | 7/1967 | Griffith | 61/1 R |
| 3,424,443 | 1/1969 | Thayer | 261/124 |
| 3,479,281 | 11/1969 | Kikindai et al. | 261/124 |
| 3,489,396 | 1/1970 | D'Aragon | 61/1 R |
| 3,927,152 | 12/1975 | Kyrias | 261/DIG. 75 |
| 3,947,359 | 3/1976 | Laurie | 261/DIG. 75 |

Primary Examiner—Frank W. Lutter
Assistant Examiner—Gregory N. Clements
Attorney, Agent, or Firm—Shoemaker and Mattare

[57] ABSTRACT

The invention relates to a gas injection or aeration device of the kind which is adapted to be immersed in a liquid and supplied with gas under pressure so that the gas emerges through diffusion nozzles of the device as a large quantity of small bubbles to form a gas/liquid mixture. According to the invention the diffusion nozzles are disposed in an upwardly extending bore of an open ended conduit submerged in the liquid. The nozzles are located between 20 and 100 centimeters below the surface of the liquid and at least 20 centimeters below the upper surface of the conduit. The nozzles are disposed in a region where the bore of the conduit is restricted to an area which is between one sixth and one twelfth of the area of the remainder of the conduit bore above the restricted region. The diffusion nozzles are constituted by holes formed laterally of at least two pipes which extend transversely across the bore of the conduit, and the aforementioned restricted area of the bore comprises at least two elongate passages defined at least in part by the said pipes. According to a characteristic feature of the invention the diffusion nozzles open directly into these passages and the holes constituting the diffusion nozzles of the pipes have diameters not exceeding 10 millimeters while the width of the passages does not exceed four times the diameter of the holes constituting the diffusion nozzles in the pipes.

6 Claims, 5 Drawing Figures

GAS/LIQUID EXCHANGE APPARATUS

This invention relates to a gas injection device adapted to be supplied with compressed gas and for use in apparatus for promoting gas/liquid exchange and in particular for aerating and circulating a liquid.

Aeration and circulation of liquids is of importance particularly in fish culture where it is known to utilize the emission of large quantities of small air bubbles in an impoundment of water, in order to rid the water of some of the toxic substances, for example ammonia, which if allowed to exceed certain small concentrations would be lethal to the fish being reared in the water. Such small bubbles of air are introduced at some intermediate depth of the liquid and rise towards the surface through the liquid causing inter alia movement of the liquid which is also advantageous in the culture of some fish, for example trout. Thus it can be said to be well known to promote circulation and aeration of the liquid in a tank for rearing fish and it is also known that the injection of small air bubbles into the liquid performs this dual function.

Similar considerations apply also to the treatment and purification of industrial and domestic effluents.

However, the introduction of the air bubbles into a fish tank at some intermediate depth below the liquid surface, necessitates the use of an air compressor which must be driven continuously, hence consuming significant power. The efficiency of the system is hence the rate of aeration and circulation of the liquid obtained for the power consumed. The initial costs of the compressor and the air injection devices are also factors of commercial importance, as are simplicity of operation and ease of maintenance.

The invention is concerned with the factors mentioned above, as distinct from problems of maintaining temperature or feeding the fish.

In a prior specification it has been described how a compressed air supply is most efficiently applied—in the form of an injection into the liquid through nozzles to form the small bubbles required—if the air diffusion nozzles are located below but not far below the surface, and preferably at a depth not exceeding one meter. In the prior specification it is also described how the diffusion nozzles are disposed in an open ended conduit, which may have curved, rectangular or polygonal walls and which defines a bore, up which the diffused bubbles and the entrained liquid rise, the upper end of the conduit being close to the surface of the liquid.

The present invention provides an injection device consisting of such a conduit and associated air diffusion means which is an improvement or modification of the devices described in the prior specification.

Accordingly, and broadly stated, the invention provides a gas injection or aeration device adapted to be immersed in a liquid, of the kind comprising a plurality of gas diffusion nozzles adapted to be supplied with compressed gas, the diffusion nozzles being disposed in an upwardly extending bore of an open-ended conduit adapted to be disposed in the liquid, wherein the nozzles are located between 20 and 100 centimeters below the upper open end of the conduit, and the nozzles being disposed at a region where said conduit bore is substantially restricted to an area which is between one sixth and one twelfth of the area of the remainder of the bore above said restricted region, the diffusion nozzles being constituted by holes formed laterally of at least two pipes extending transversely across the bore of the conduit, the said restricted area of the bore consisting of at least two elongated passages defined at least in part by said pipes, and wherein the diffusion nozzles open directly into these passages, the holes constituting the diffusion nozzles having diameters not exceeding 10 millimeters and the width of the passages not exceeding four times the diameter of the holes.

A line of such holes, preferably 2 to 8 millimeters in diameter, is formed on the pipes preferably 2 to 10 millimeters apart.

The conduit bore is preferably rectangular and the pipes are disposed in parallel transversely across the conduit bore. The pipes may be fed, with compressed gas (for example air), by a common manifold which is either disposed in the conduit bore or disposed externally of the conduit feeding the pipes laterally.

The restriction of the conduit bore may be formed by, in addition to the pipes, a baffle plate or plates. However, the arrangement of the restricted region of the bore will be such that a free space preferably of at least 10 millimeters is left around and opposite each diffusion nozzle.

The conduit bore may terminate a short distance below the lines of diffusion nozzles and a protective screen, for example of wire mesh, may cover the lower end of the conduit bore. Alternatively, the bore may be extended to any convenient depth in order to entrain liquid at a level close to the bottom of a tank or impoundment.

Two embodiments of gas injection devices according to the invention are shown in the accompanying drawings in which:

FIG. 2 is a cross-sectional view of a first embodiment; while:

Figure 1:
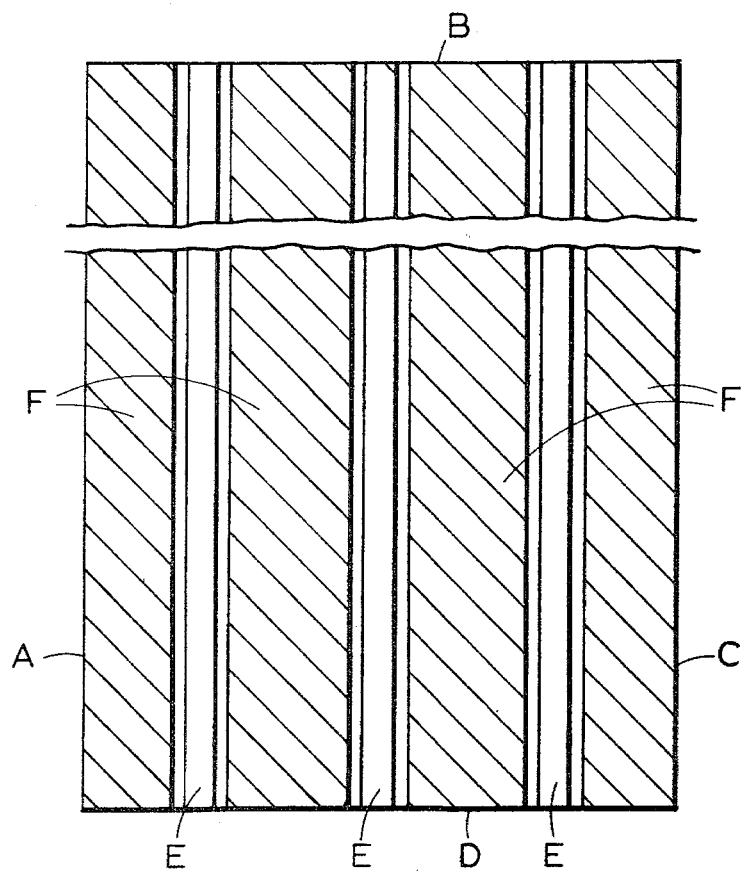
FIG. 1 is a plan view.
Figure 2:
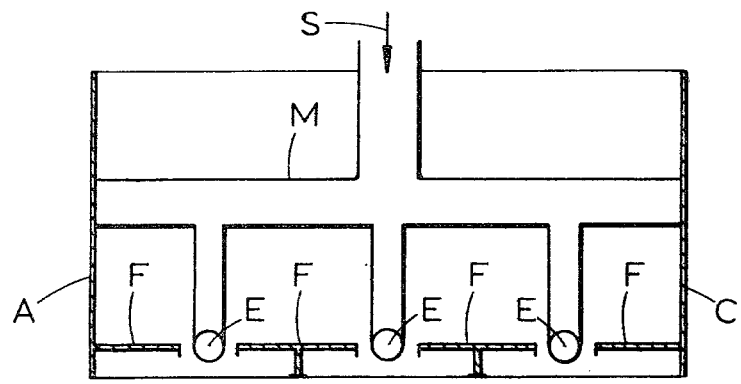

The embodiment shown in FIGS. 1 and 2 is intended to be supplied with air at a rate of about two cubic meters per minute.

The conduit bore is bounded by four walls A, B, C and D defining a rectangle of 100×50 centimeters.

One of the walls could, instead of being a separate wall element, be constituted by a wall component bounding a liquid impoundment or tank in which the device is to be installed.

In the embodiment illustrated in FIGS. 1 and 2, three pipes E, each 100 centimeters in length, are located parallel to one another and to the walls A and C which are 50 centimeters apart. A baffle is formed by four shelves F aligned with the pipes E, which shelves F close the gap between adjacent pipes and between the pipes and the walls A and C, except that adjacent the sides of each pipe a gap P of 1 centimeter is left open. The pipes E have an overall diameter of 32.5 millimeters and are fed by a common manifold M from a supply pipe connected to a source S of compressed air. The air is discharged from the pipes E into the gaps between the pipes E and the shelves F through horizontally directed holes drilled laterally on both sides of the pipes. These holes are drilled evenly spaced at 10 millimeter centres and each hole is 4.7 millimeters in diameter.

When the gaps P between the pipes E and the shelves F have a width of 1 centimeter and a length of 100 centimeters, the total area of the gaps will be 12% of the total area of the bore of the conduit defined by the four walls A, B, C and D, which as aforesaid, define a rectangular bore of 50×100 centimeters.

The walls A, B, C and D extend, in the embodiment illustrated, 25 centimeters above the height of the shelves F, the walls may also extend as shown a short distance below the shelves F and the lower end of the conduit bore may be covered by a screen.

The gas injection device illustrated in FIGS. 1 and 2 is adapted to be immersed in a body of liquid to a depth such that the pipes E are not more than one meter and preferably not more than 65 centimeters below the surface of the liquid.

Figure 4:
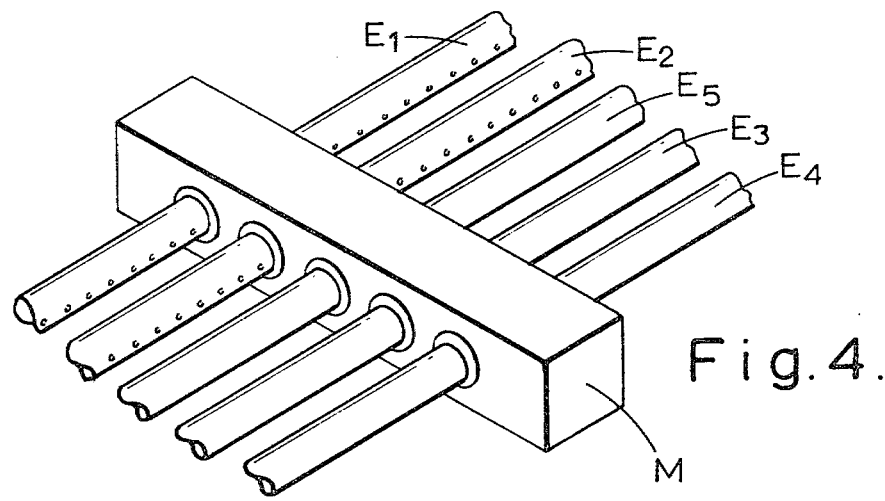
FIG. 4 is a perspective view of a manifold and of pipes forming part of the device shown in FIG. 3.
Figure 3:
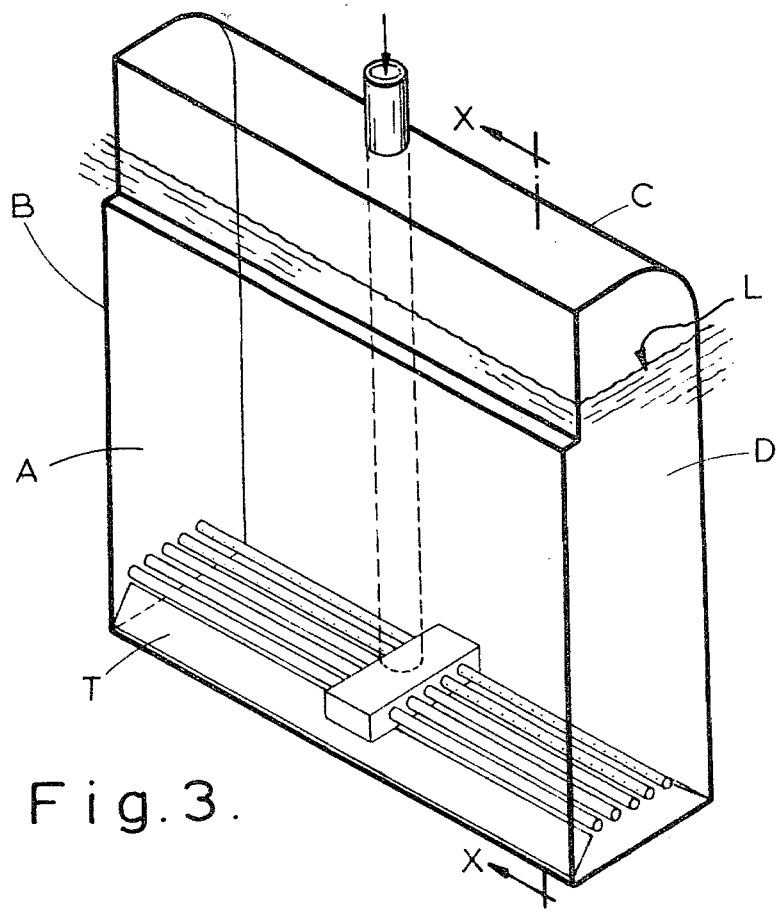
FIG. 3 is a perspective view of a second embodiment.
Figure 5:
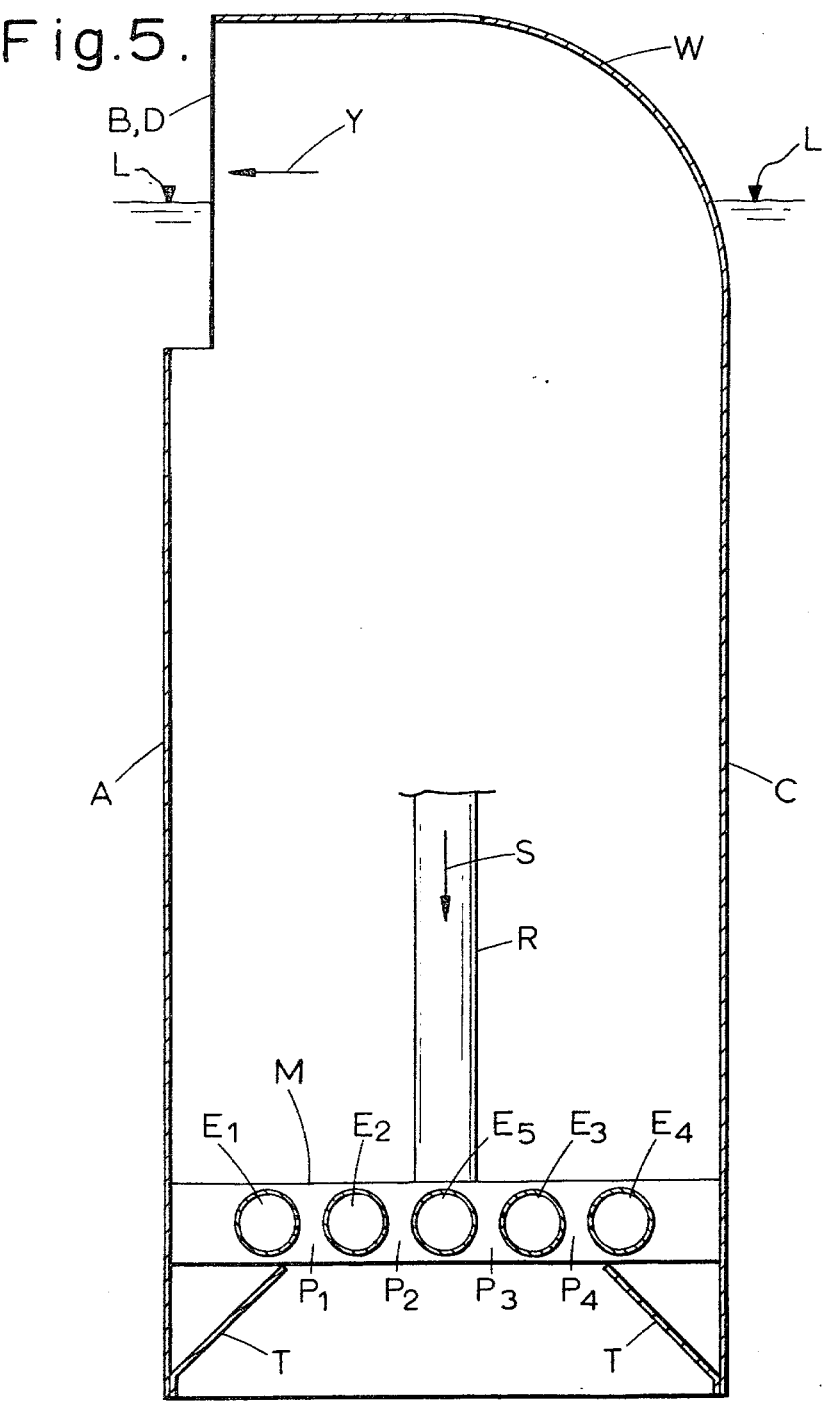
FIG. 5 is a cross-sectional view taken on the line X—X of FIG. 3.

In the second embodiment shown in FIGS. 3 to 5, five pipes E each 100 centimeters in length are located parallel to one another within a rectangular conduit having dimensions 100×32 centimeters and defined by walls A, B, C and D. These walls are of sheet plastics material, suitably glass reinforced plastics material and the pipes E are suitably of polypropylene.

The pipes E are of 40 millimeters outside diameter and are disposed, in parallel, at 50 millimeter centers so that there are gaps P each of 10 millimeters width between adjacent pipes.

The pipes $E_1$ and $E_2$ in FIGS. 4 and 5 are each formed on one side only with a row of diffuser nozzles constituted by holes of 4.5 millimeters diameter at centres of 8 millimeters, these nozzles facing directly horizontally into the gaps $P_1$ and $P_2$.

The pipes $E_3$ and $E_4$ are similarly formed with rows of diffusion nozzles facing into the gaps $P_3$ and $P_4$.

The central pipe $E_5$ is not pierced by holes and serves to give a symmetrical arrangement to the four gaps.

The pipes E are fed from a common manifold M from a downpipe R to which is fed a supply S of air at a rate of say two cubic meters per minute.

The conduit is so disposed in the liquid whose level is indicated at L, that the nozzles are located at a depth of about 60 centimeters. The walls A, B, C and D of the conduit extend 10 centimeters below the nozzles and to the walls A and C are fixed deflector plates T which are inclined inwardly and upwardly towards the outer pipes $E_1$ and $E_4$ to terminate just short of these pipes.

The wall A extends 50 centimeters above the nozzles and terminates 10 centimeters below the liquid level. The wall C extends upwardly to form a hood W above liquid level L, which hood curves inwardly over the conduit bore defined by the walls A, B, C and D. The walls B and D extend upwardly to meet the hood W. The walls and the hood therefore define a slot facing in the direction of the arrow Y at the surface level L of the liquid.

When air is supplied to the manifold M it is discharged through the diffusion nozzles into the passages of gaps P between the pipes E. The air will be discharged into the liquid to form bubbles.

This will result in the region immediately above the nozzles being occupied by a mixture of liquid and air bubbles, which mixture will have a density (approximately 0.79) which is markedly lower than that of the liquid which is in the region immediately below the row of pipes P. As a result liquid will commence to flow up through the gaps P into the conduit bore above these gaps. This bore has a cross-sectional area of 3,200 square centimeters. While the total area of the four gaps P is 400 square centimeters. As a result the liquid flows through the gaps P eight times faster than it flows when it rises in the unrestricted region of the bore above the gaps P.

The liquid flow has its highest velocity as it crosses the nozzles—in laminar flow—where the air is being diffused. This results in the liquid flow shearing the air bubbles emerging from the nozzles into a much larger number of smaller bubbles. This shearing effect has been measured to result in the mixture in the unrestricted area of the conduit bore above the gaps P containing approximately 20% air. Moreover, with an air supply of two cubic meters per minute the liquid flow, through the gaps P, in the device illustrated in FIGS. 3 to 5 and described, has been measured at 3 cubic meters per minute at a speed of 150 centimeters per second.

The liquid/air mixture in the unrestricted bore region above the passages P will be in a state of high turbulence and this results in improved gas-water interchange in the liquid before it flows over the top of wall A in the direction of the arrow Y. The oxygen content will be of the order of 4.5 milligrams per liter of water discharged assuming that the intake water is totally deficient in oxygen.

The rate of air supply is of course an indication of the energy required to achieve the given rate of oxygenation. It would be possible to achieve higher rates of oxygenation but only it is believed at higher rates of energy consumption and initial capital cost.

The efficiency of the device according to the invention is dependent upon a number of inter-related variable factors. Among these may be mentioned the depth of the gas diffusion nozzles; the sizes of the holes constituting these nozzles; the number and distribution of these holes; and the layout of the pipes in which the holes are formed and which define the passages where the gas and liquid are mixed. For example the depth and size of the nozzles affects the energy consumption for if the nozzles are too deep or too small, more power will be required to drive gas through the nozzles. On the other hand, if the nozzles are too shallow or too large the air issuing through the nozzles will not be sufficiently dispersed in small bubble form in the liquid and will not effect such an effective gas-liquid interchange.

It should be emphasized that at the depth specified at least 70% of gas transfer out of or into the bubbles takes place at the moment of formation of the bubble. Accordingly these embodiments have been designed in part to maximise the number of formations or 'births' of bubbles for a given volume of air supply.

Accordingly, these and other factors have been extensively explored and practically tested in order to obtain the device according to the invention.

We claim:

1. A gas injection or aeration device of the kind adapted to be immersed in a liquid and supplied with gas under pressure so that the gas emerges through diffusion nozzles of the device as a large quantity of small bubbles to form a gas/liquid mixture, wherein the diffusion nozzles are disposed in an upwardly extending bore of an open-ended conduit submerged in the liquid, the nozzles being located between 20 and 100 centimeters below the surface of the liquid and at least 20 centimeters below the upper open end of the conduit, and wherein the nozzles are disposed at a region where the bore of the conduit is restricted to an area which is between one sixth and one twelfth of the area of the remainder of the bore above said restricted region, the diffusion nozzles being constituted by a plurality of holes each arranged to introduce gas into the bore in a direction perpendicular to the direction of flow of liquid past said holes, said holes being arranged laterally of at least two pipes which pipes extend transversely across the bore of the conduit, the said restricted area of the bore comprising at least two elongated passages defined at least in part by said pipes, and wherein the diffusion nozzles open directly into these passages, the holes constituting the diffusion nozzles having diameters not exceeding 10 millimeters and the width of the passages not exceeding four times the diameter of the holes in order to establish laminar flow of liquid adjacent said holes to shear off bubbles of gas leaving said holes thereby producing a large number of small bubbles having a resultant combined large surface area, the flow of liquid past said holes inducing turbulence in the region of the riser tube above the diffusion nozzles to thus promote gas/liquid interchange.

2. A device according to claim 1, wherein the bore of the conduit is rectangular and wherein there are at least three adjacent pipes in parallel extending transversely across the conduit bore, the passages between the pipes not exceeding 15 millimeters.

3. A device according to claim 2, wherein each diffusion nozzle is constituted by a lateral horizontally directed hole of 2 to 8 millimeters diameter in the pipes, each pipe being formed with a line of such holes which are between 2 and 10 millimeters apart.

4. A device according to claim 2, wherein, below the pipes extending across the bore, there are deflector plates located, inclined in the bore and arranged to cause laminar flow of liquid over the diffuser nozzles constituted by the holes formed in said pipes.

5. A device according to claim 1, wherein the conduit bore is rectangular and defined by walls which extend upwardly over a distance of at least 50 centimeters from the diffusion nozzles, these nozzles being constituted by rows of holes formed laterally in at least four pipes extending horizontally across the bore, the said four pipes being grouped in pairs on opposite sides of a further pipe having no holes therein, the elongate passages between adjacent said pipes not exceeding 15 millimeters in width and the diameters of the holes in said pipes not exceeding 5 millimeters.

6. A device according to claim 1, wherein the restriction in the conduit bore is formed by a baffle plate or plates in addition to the pipes and a manifold whereby the pipes are fed with compressed gas.

* * * * *